(12) United States Patent
Pedicini et al.

(10) Patent No.: US 6,265,094 B1
(45) Date of Patent: Jul. 24, 2001

(54) ANODE CAN FOR A METAL-AIR CELL

(75) Inventors: Christopher S. Pedicini, Roswell; John Witzigreuter, Kennesaw, both of GA (US)

(73) Assignee: AER Energy Resources, Inc., Smyrna, GA (US)

( * ) Notice: Subject to any disclaimer, the term of this patent is extended or adjusted under 35 U.S.C. 154(b) by 0 days.

(21) Appl. No.: 09/191,402

(22) Filed: Nov. 12, 1998

(51) Int. Cl.$^7$ ................................................ H01M 4/00
(52) U.S. Cl. .......................... 429/27; 429/149; 429/166
(58) Field of Search .............................. 429/27, 166, 149, 429/101, 168, 59

(56) References Cited

U.S. PATENT DOCUMENTS

| | | | |
|---|---|---|---|
| 3,023,259 | 2/1962 | Coler et al. | 136/6 |
| 3,026,365 | 3/1962 | Hughes et al. | 136/100 |
| 3,630,783 | 12/1971 | Przybyla | 136/107 |
| 3,746,580 | 7/1973 | Aker et al. | 136/86 A |
| 3,853,629 | 12/1974 | Elliott | 136/111 |
| 3,881,959 | 5/1975 | Tsuchida et al. | 136/86 A |
| 3,920,477 | 11/1975 | Alaburda | 136/108 |
| 4,105,830 | 8/1978 | Kordesch | 429/27 |
| 4,242,424 | 12/1980 | Buckler et al. | 429/152 |
| 4,262,062 | 4/1981 | Zatsky | 429/27 |
| 4,333,993 | 6/1982 | Gibbard | 429/27 |
| 4,343,869 | 8/1982 | Oltman et al. | 429/27 |
| 4,404,266 | 9/1983 | Smilanich | 429/27 |
| 4,461,812 | 7/1984 | Mascioli | 429/29 |
| 4,535,036 | * 8/1985 | Kelm et al. | 429/99 |
| 4,551,399 | * 11/1985 | Despic | 429/27 |
| 4,585,710 | 4/1986 | McEvoy | 429/27 |
| 4,664,994 | 5/1987 | Koike et al. | 429/163 |
| 4,957,826 | 9/1990 | Cheiky . | |
| 4,965,147 | 10/1990 | Mas et al. | 429/136 |
| 5,306,578 | 4/1994 | Ohashi et al. | 429/27 |
| 5,356,729 | 10/1994 | Pedicini | 429/27 |
| 5,432,022 | 7/1995 | Cheiky | 429/27 |
| 5,451,473 | 9/1995 | Oltman et al. | 429/27 |
| 5,458,988 | 10/1995 | Putt | 429/27 |
| 5,547,781 | 8/1996 | Blonsky et al. | 429/174 |
| 5,560,999 | 10/1996 | Pedicini et al. | 429/27 |
| 5,567,538 | 10/1996 | Oltman et al. | 429/27 |
| 5,582,930 | 12/1996 | Oltman et al. | 429/27 |
| 5,582,932 | 12/1996 | Oltman et al. | 429/176 |
| 5,605,774 | 2/1997 | Ekern et al. | 429/248 |
| 5,654,110 | 8/1997 | Tuttle et al. | 429/66 |
| 5,663,014 | 9/1997 | Blonsky et al. | 429/175 |
| 5,691,074 | 11/1997 | Pedicini | 429/27 |
| 5,705,294 | 1/1998 | Lake | 429/27 |
| 5,716,726 | * 2/1998 | Cheiky | 429/25 |
| 5,733,677 | 3/1998 | Golovin et al. | 429/27 |

FOREIGN PATENT DOCUMENTS 0 741 427 A1   11/1996   (EP) .

OTHER PUBLICATIONS

"Air–Cathode with Zinc Anodes Make High–Energy Density Batteries" Mar. 1979 Electronic Design.

* cited by examiner

Primary Examiner—Stephen Kalafut
Assistant Examiner—Julian A. Mercado
(74) Attorney, Agent, or Firm—Alston & Bird LLP

(57) ABSTRACT

A metal-air cell with an anode container. The anode container is made from a reactive metal. The metal-air cell also has an absorbent layer with a first side and a second side. An electrolyte is substantially trapped within the absorbent layer. The first side of the absorbent layer is positioned in contact with the anode container and an air electrode is positioned in contact with the second side of the absorbent layer.

24 Claims, 3 Drawing Sheets

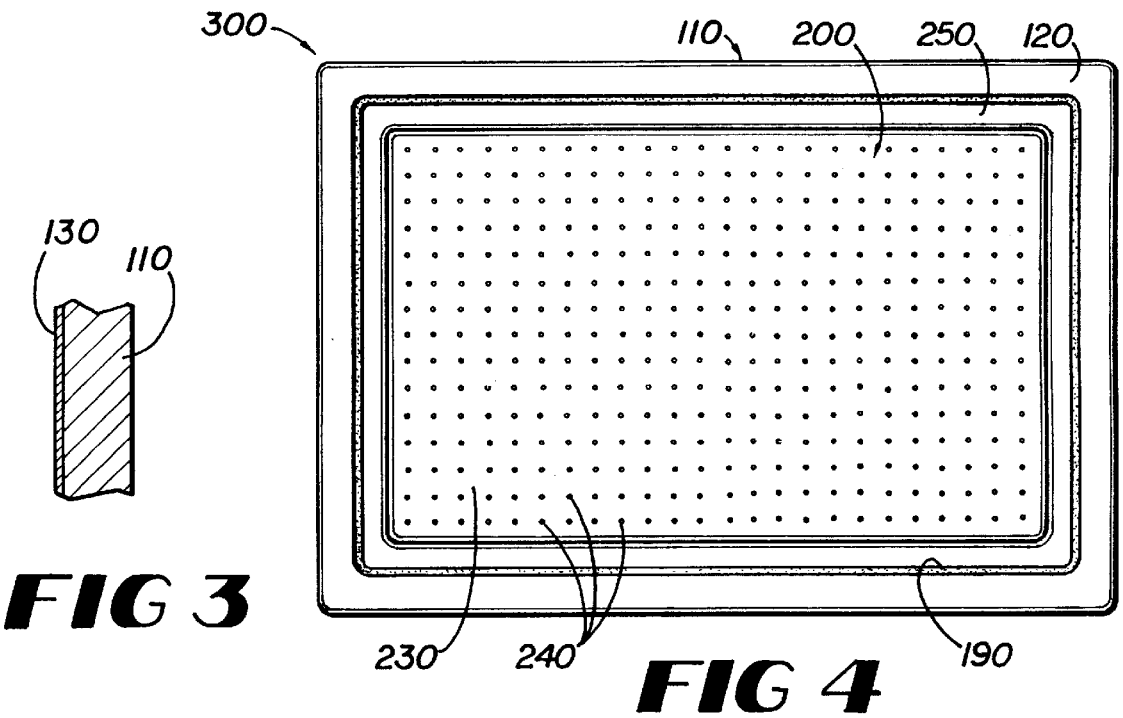
FIG 3
FIG 4
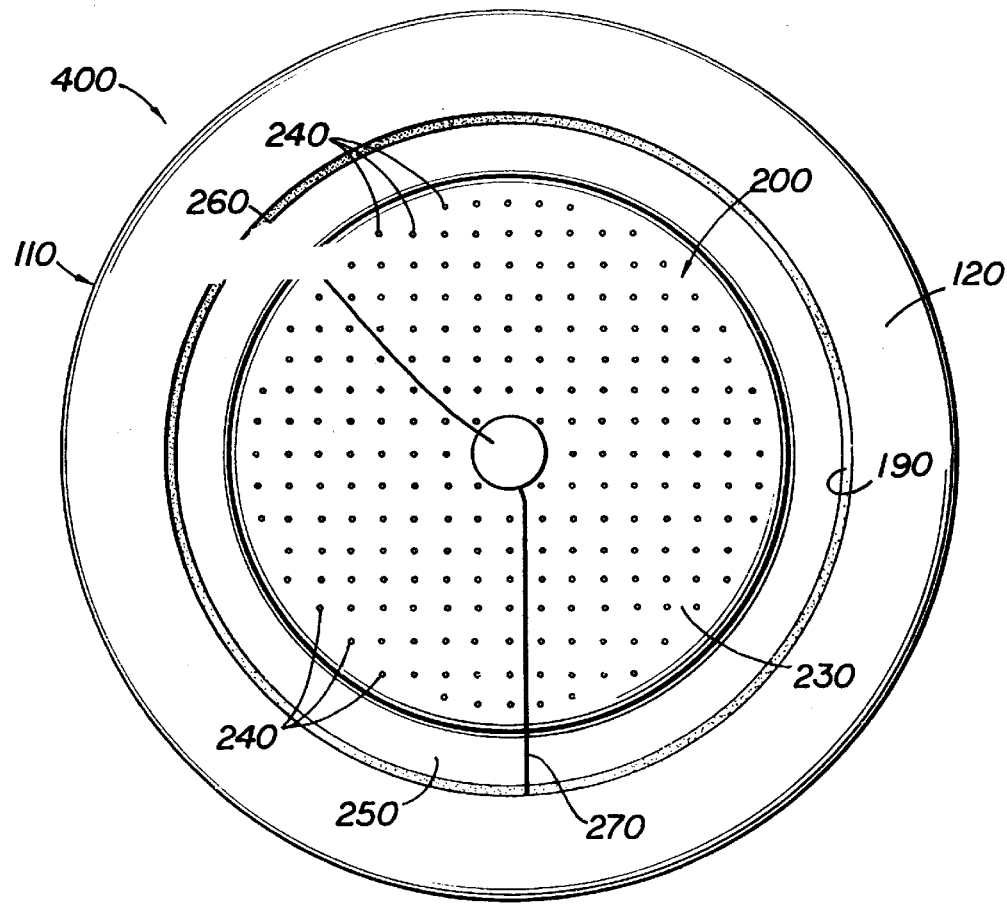
FIG 5

ANODE CAN FOR A METAL-AIR CELL

TECHNICAL FIELD

The present invention relates to a metal-air battery cell and more particularly relates to an anode can that functions both as the metal anode and as the container for the metal-air cell itself.

BACKGROUND OF THE INVENTION

Generally described, a metal-air cell, such as a zinc-air cell, uses an air permeable cathode separated from a metallic zinc anode by an aqueous electrolyte. During operation of the cell, oxygen from the ambient air is converted at the cathode to produce hydroxide ions while the metallic zinc is oxidized at the anode to react with the hydroxide ions. Water and electrons are released in this reaction to provide electrical energy.

As compared to conventional types of electrochemical cells, metal-air battery cells provide relatively high power output and lifetime with relatively low weight. These advantages are due in part to the fact that metal-air cells utilize oxygen from the ambient air as a reactant in the electrochemical process rather than a heavier material such as a metal or metallic composition. One drawback, however, with the current design of metal-air cells is that the cells tend to be somewhat larger in size than conventional electrochemical cells. This size constraint is caused by the requirement of having an anode, a cathode, an electrolyte, a cell casing of some sort, and an air passageway to provide reactant air to the cell. For example, a typical metal-air "button"-type cell is found in U.S. Pat. No. 5,451,473, showing an anode can or container, a metal zinc gel or powder within the anode can, a cathode can, an air cathode within the cathode can, an air passageway with an air membrane, and several internal support and sealing structures. Each of these elements is necessary for the cell to operate and requires a certain amount of space.

Although metal-air cells are preferred because of the higher power output, longer life, and lower weight as compared to conventional electrochemical cells, the size of typical metal-air cells has prevented wide spread use of such metal-air cells in many types of applications. There is a need, therefore, for a metal-air cell with a reduced size but with the traditional metal-air advantages and capabilities. In other words, a metal-air cell in the size and shape of a conventional electrochemical cell. Such a cell would have broad availability for many different types of applications. These goals must be accomplished in a cell that remains light-weight and relatively inexpensive for wide spread consumer use.

SUMMARY OF THE INVENTION

Generally described, the present invention provides a metal-air cell with an anode container. The anode container is made from a reactive metal. The metal-air cell also has an absorbent layer with a first side and a second side. Electrolyte is substantially trapped within the absorbent layer. The first side of the absorbent layer is positioned in contact with the anode container and an air electrode is positioned in contact with the second side of the absorbent layer. Specific embodiments of this invention include the anode container in the shape of a can. The container is made from a zinc metal or a zinc alloy metal.

Other specific embodiments of the present invention include positioning the absorbent layer within the anode container. The absorbent layer may be made from a nylon or similar materials. The electrolyte may be potassium hydroxide or similar fluids. The metal-air cell also may include a gasket positioned between the anode container and the air electrode such that the anode container and the air electrode are not in physical contact with each other. The gasket may be made from a nylon or similar materials.

The metal-air cell herein also may include an air mask enclosing the anode can. The air mask may have an open area of about one to five percent. The air mask provides a gas mixing area for the ambient air that has seeped into the cell. The air mask may be a nickel-plated steel or similar types of conductive materials. The air mask also may be made from a plastic with a metal plate or plating. Alternatively, the cell may use a cathode tab.

Finally, the metal-air cell also may have a thin film substantially covering the outside of the anode container to prevent the container from leaking electrolyte. The thin film may be made from a polyester or similar types of electrolyte impervious materials.

The metal-air cell of the present invention may be used on its own like a conventional button cell or as part of a multi-cell battery pack positioned within a housing. The battery pack may use an air manager in association with the housing to provide reactant air thereto.

For example, a thin metal-air battery may have a substantially rigid container with a plurality of cell compartments formed therein and sharing a common floor and one or more common walls. Each cell compartment has an air electrode positioned therein to form a plurality of metal-air cells. A cover then encloses the container. The container itself is made from a reactive metal such as zinc. Alternatively, a metal anode may be positioned within the container. An air manager may be positioned adjacent to or within the container.

It is thus an object of the present invention to provide an anode can for a metal-air cell.

It is a further object of the present invention to provide an anode that functions as a cell container for a metal-air cell.

It is another object of the present invention to provide a thin metal-air cell.

It is yet another object of the present invention to provide a thin metal-air cell with improved power, weight, and lifetime characteristics as compared to a conventional electrochemical cell.

It is yet another object of the present invention to provide an improved metal-air button cell.

It is still another object of the present invention to provide an improved metal-air cell.

It is an even further object of the present invention to provide a thin metal air battery with cells sharing a common casing.

Other objects, features, and advantages of the present invention will become apparent upon review of the following detailed description of the preferred embodiments of the invention, when taken in conjunction with the drawings and the claims.

BRIEF DESCRIPTION OF THE DRAWINGS

FIG. 3 is a side cross-sectional view of the anode can and the outer thin film.

FIG. 4 is a plan view of an alternative embodiment of the metal-air cell of the present invention showing a rectangular cell.

FIG. 5 is a plan view of an alternative embodiment of the metal-air cell of the present invention showing a cell with a cathode tab and a lead.

DETAILED DESCRIPTION OF THE INVENTION

Figure 1:
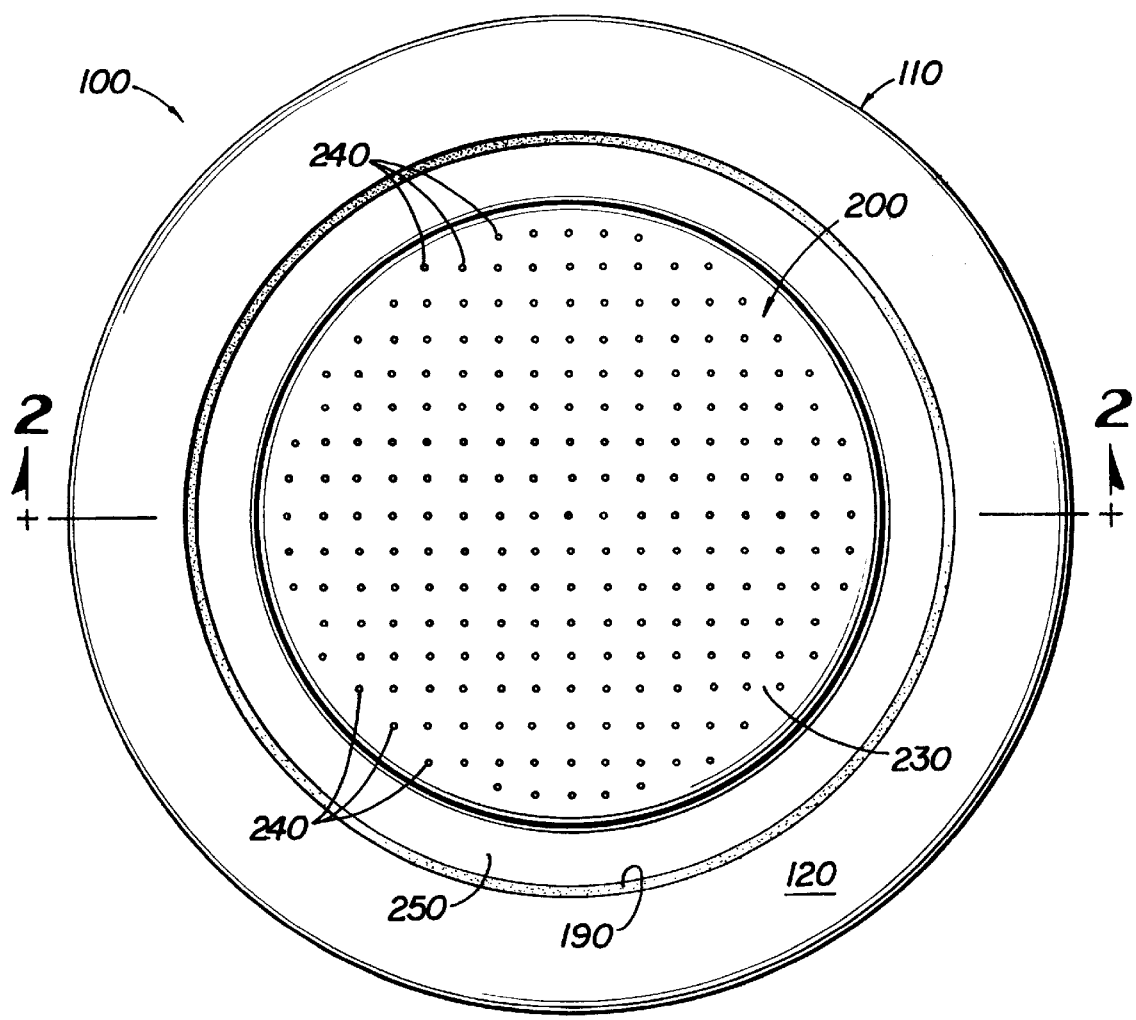
FIG. 1 is a plan view of the metal-air cell of the present invention.
Figure 2:
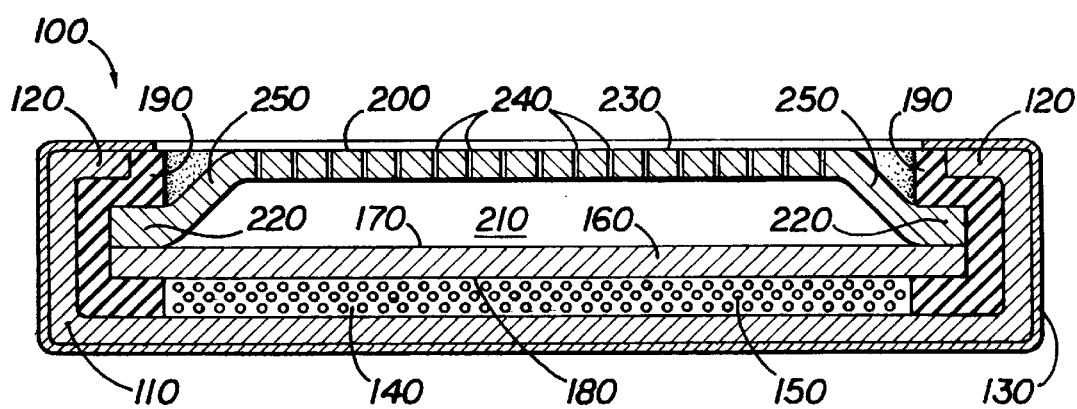
FIG. 2 is a side cross-sectional view of the metal-air cell taken along line 2—2 of FIG. 1.

Referring now to the drawings, in which like numerals indicate like elements throughout the several views, FIGS. 1–2 show an improved metal-air cell 100. The improved metal-air cell 100 includes an anode container or can 110. The anode can 100 not only acts as the anode and the negative connection for the cell 100, the anode can 110 also acts as the container for the other elements of the cell 100, as described below. The anode can 110 of the present invention is similar in basic design to the anode can used in "LeClanche" or zinc-chloride cells where a zinc alloy anode can generally contains a manganese dioxide cathode, a chlorine based electrolyte, and a carbon rod as the positive current collector. Such LeClanche cells were widely used before the introduction and acceptance of alkaline primary cells.

The anode can 110 herein is preferably in the shape of a relatively shallow can with a horizontally extending upper lip 120. The anode can 110 in this configuration may be manufactured by a conventional punch method or other types of conventional manufacturing techniques. Specifically, a flat metal zinc plate is punched and drawn into a can shape. The lip 120 is then rolled over. The lip 120 may not be needed if the remaining elements of the cell 100 are sealed together to prevent electrolyte leakage. The height of the cell 100 may be as low as about two millimeters. Although the term "can" is used herein, the shape of the anode can 110 may be of any convenient shape to contain the elements of the cell 100 as described herein.

The anode can 110 is preferably made from a reactive metal such as zinc. A zinc alloy also may be used to improve the formability of the metal. The anode can 110 is generally of uniform wall thickness. The wall thickness for the anode can 110 depends upon the overall size of the cell and the desired lifetime of the cell 100. The total amp hours available from the cell 100 depends upon the thickness of the walls, i.e., the amount of metal zinc available to be consumed. Zinc has a density of about 7.1 grams per cubic centimeter (g/cc). Theoretically, 820 milliamp hours per gram (mah/gm) is possible. The specific thickness for the can 100 depends upon the capacity requirements of the cell 100.

The anode can 110 may be coated with a thin film 130. The thin film 130 preferably covers the exterior of the anode can 110 completely. The thin film 130 must be resistant to electrolyte to prevent the cell 100 from leaking as the metal zinc of the anode can 110 is consumed. The thin film 130 need not provide physical structure to the cell 100. The thin film 130 may be made from Mylar or similar types of polyester or other types of plastic films. The thickness of the film 130 may be about one to ten mils thick depending upon the material used and the size of the anode can 110. The example described above would preferably use a film 130 with a thickness of about one (1) mil. The thickness of the film 130 is exaggerated in FIG. 2. A more accurate representation of the thickness of the film 130 is found in FIG. 3. The film 130 may be metalized so as to be electrically conductive.

Positioned within the anode can 110 is an absorbent layer 140. The absorbent layer 140 is positioned on the inside bottom of the anode can 110. The absorbent layer 140 substantially traps and immobilizes a liquid electrolyte 150 therein such that there is little, if any, free flowing electrolyte 150. The electrolyte 150 is essentially trapped in place in the absorbent layer 140 such that the cell 100 can operate in any orientation. The absorbent layer 140 may be an absorbent fibrous web such as nylon. A preferred absorbent layer 140 includes a nylon sold by Hollingsworth and Vose of East Walpole, Mass. under the designation TR1113G.

The electrolyte 150 may be any suitable simple or mixed aqueous base type such as a Group I metal hydroxide. Examples include LiOH, NaOH, KOH, CsOH, or the like, in the range of one molar to saturation, usually in the range of about 1 to 15 m.

Positioned on top of the absorbent layer 140 is an air cathode 160. The air cathode 160 is of conventional design for a primary metal-air cell. The air cathode 160 has an air side 170 and electrolyte side 180. The air side 170 generally includes a mixture of carbon black particles and a hydrophobic polymer, such as polytetrafluoroethylene or Teflon. The electrolyte side 170 generally includes catalyzed particles of active carbon and Teflon particles in contact with the electrolyte 150 of the absorbent layer 140.

The anode can 110 and the air cathode 160 are physically separated from each other by a gasket 190. The gasket 190 lines the inner wall of the anode can 110 and provides physical support around the periphery of the air cathode 160. The gasket 190 must be substantially impervious to the electrolyte 150. A preferred material for the gasket 190 is a nylon or a similar type of material.

Positioned on top of the air cathode 160 is an air mask 200. The air mask 200 is preferably dome or arch shaped such that an air mixing space 210 is created between the air mask 200 and the air cathode 160. The air mask 200 has a substantially flat lateral edge 220 that is in electrical contact with the air cathode 160. The flat lateral edge 220 is also positioned within the gasket 190 and sealed therein. The air mask 200 also includes a substantially flat top mask portion 230. The mask portion 230 includes a plurality of air holes 240. The mask portion 230 has an open area of approximately one to five percent. The flat lateral edge 220 and the top mask portion 230 are connected by a dome portion 250. The gas mixing area 210 permits the ambient air that penetrates through the air holes 240 to mix properly before contacting the air cathode 160 so as to provide for full utilization of the cathode 160.

The air mask 220 is preferably made from an electrically conductive metal such as a nickel-plated steel. Alternatively, the air mask 220 may be a substantially rigid plastic with a metal-plated, conductive exterior. The purpose of the conductive metal in the air mask 200 is to act as the positive electrical connection for the cell 100. Although the air mask 200 adds physical structure to the cell 100, the air mask 200 is not required for the cell 100 to operate. The cell 100 is functional without the air mask 200 because the cell 100 is substantially sealed by the air cathode 160.

FIG. 4 shows an alternative embodiment of the present invention. FIG. 4 shows a largely rectangular metal-air cell 300. The components of the rectangular metal-air cell 300 are identical to those described above with respect to the metal-air cell 100. As is shown in FIGS. 1 and 4, the shape of the metal-air cell 100, 300 can be of any conventional design and may depend on the ultimate application of the cell 100, 300 or its desired lifetime.

FIG. 5 shows another alternative embodiment, a metal-air cell 400. This embodiment uses a cathode tab 260 as the positive connection for the metal-air cell 400. The cathode tab 260 is in electrical contact with the air cathode 160 by a lead 270. The cathode tab 260 may be of any convenient shape or size. The cathode tab 260 and the lead 270 may be made of any type of electrically conductive material, such as the nickel-plated steel described above. By using the cathode tab 260, the air mask 200 need not contain a conductive element. Rather, the air mask 200 may be made completely from a plastic or other type of nonconductive material or the air mask 200 may be missing in its entirety.

In use, the anode can 110 acts as the negative connection for the cell 100 and the air mask 200 acts as the positive connection. Ambient air enters through the air holes 240 in the air mask 220 and penetrates the air side 170 of the cathode 160. Oxygen from the ambient air begins the electrolytic reaction at the cathode 160 that results in the production of current from the cell 100. The transfer of ions between the anode can 110 and the cathode 160 is accomplished through the electrolyte 150 absorbed in the absorbent layer 140. The metal zinc of the anode can 110 is consumed in the electrochemical reaction until the metal zinc is substantially consumed. The thin film 120 prevents the cell 100 from leaking electrolyte 150 once the anode can 110 is compromised.

The metal-air cell 100 of the present invention may be used on its own in a manner similar to that of a conventional button-type cell. The metal-air cell 100 may be used with low power electronics such as cellular telephones or pagers (not shown). Alternatively, a plurality of the cells 100 may be positioned within a conventional air manager (not shown). An example of such an air manager is found in commonly-owned U.S. Pat. No. 5,691,074, U.S. Pat. No. 5,560,999, and U.S. Pat. No. 5,356,729, incorporated herein by reference, or any conventional type of air manager system for a metal-air type battery.

Figure 6:
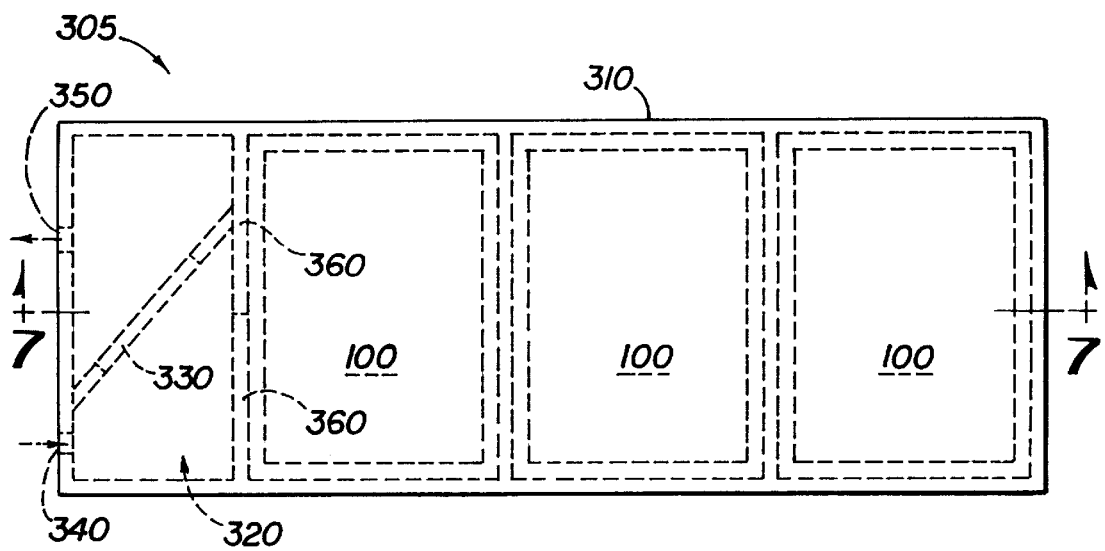
FIG. 6 is a diagrammatic top view of the battery housing with a common anode can.
Figure 7:
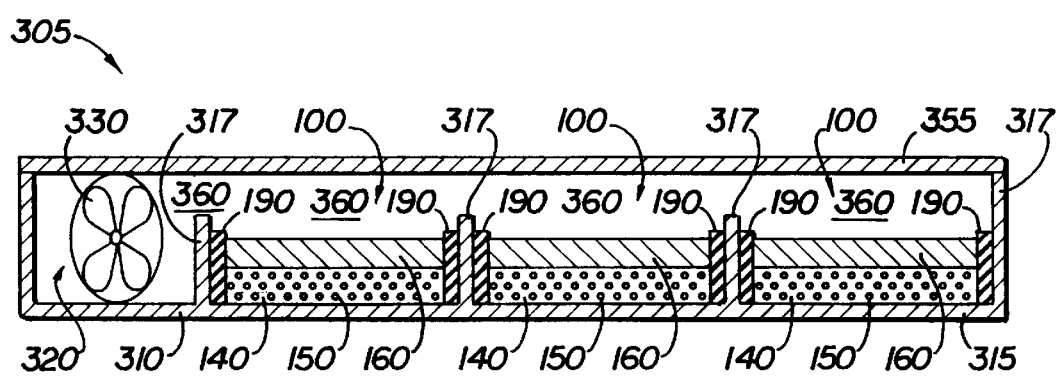
FIG. 7 is a cross-sectional view taken along line 7—7.

The embodiment of FIGS. 6 and 7 shows a multiple cell battery pack 300. The battery pack 300 has three (3) cells 100. In this embodiment, the cells 100 share a common anode can 310. By common anode can 310, it is meant that the zinc metal is manufactured to form three (3) contiguous cell containers or cells 100. The common anode can 310 includes a common floor 315 and a plurality of walls 317 to separate the individual cells 100. Layered within each cell 100 is the individual absorbent layer 140 that substantially traps and immobilizes the liquid electrolyte 150 and the individual air cathode 160. Each cathode 160 is separated from the anode can 310 by the gaskets 190.

Positioned immediately adjacent to the anode can 310 is the air manager unit 320. The air manager unit 320 includes a fan 330 with an air inlet 340 and an air outlet 350. The air manager unit 320 may be attached to the anode can 310 by any conventional method. Alternatively, the air manager unit 320 may be a contiguous part of the anode can 310, i.e., the cells 100 and the air manager unit 320 form a single container. The entire battery 300 is then enclosed with a cover 350. The cover 350 is raised slightly off of the anode can 310 so as to create an air plenum 360. The cover 350 may be made from plastic or any conventional material. The common anode can 310, the air manager unit 320, and the cover 350 largely isolate the cells 100 from the ambient air other than the air that passes through the air inlet 340 and the air outlet 350 when the fan 330 is on. The cells 100 remain largely isolated from the ambient air when the fan 330 is off. The air inlet 340 and the air outlet 350 may be substantially in the form of the diffusion tubes disclosed in commonly owned U.S. Pat. No. 5,691,074, incorporated herein.

In use, air enters the air manager unit 320 through the air inlet 330. The air is forced by the fan 330 to circulate through the air plenum 360 and then either to recirculate or to pass out the air outlet 350. By using the anode can 310 as the bottom casing for the battery 300, the battery 300 may be very thin in that a separate cell casing element is eliminated. The metal cell casing need not be made of a reactant metal to provide a thin cell. Rather, a metal anode may be positioned within individual compartments of a common metal housing similar to the anode can 310.

The present invention thus provides a substantially thinner and more compact metal-air cell 100 as compared to known cells. By eliminating the traditional anode container found in conventional metal-air button cells through the use of the metal zinc anode can 110, the present invention achieves a significant reduction in size without the loss of significant power capability, lifetime, or weight. The present invention therefore provides a thin metal-air cell that maintains the traditional advantages of metal-air technology.

The foregoing relates only to the preferred embodiments of the present invention, and many changes may be made herein without departing from the scope of the invention as defined by the following claims.

What is claimed is:

1. A metal-air cell, comprising:
    an anode in the form of a reactive metal container; .
    an absorbent fabric layer within said container, comprising a first side and a second side; said first side of said absorbent fabric layer positioned in contact with said anode container;
    a liquid electrolyte substantially trapped within said absorbent fabric layer; and
    an air electrode positioned in contact with said second side of said absorbent fabric layer.

2. The metal-air cell of claim 1, wherein said reactive metal container comprises a can.

3. The metal-air cell of claim 1, wherein said reactive metal container comprises zinc metal.

4. The metal-air cell of claim 1, wherein said reactive metal container comprises a zinc alloy metal.

5. The metal-air cell of claim 1, wherein said absorbent fabric layer comprises nylon.

6. The metal-air cell of claim 1, wherein said liquid electrolyte comprises potassium hydroxide.

7. The metal-air cell of claim 1, further comprising a gasket positioned between said reactive metal container and said air electrode such that said reactive metal container and said air electrode are not in physical contact.

8. The metal-air cell of claim 7, wherein said gasket comprises nylon.

9. The metal-air cell of claim 1, further comprising an air mask enclosing said reactive metal container.

10. The metal-air cell of claim 9, wherein said air mask comprises an open area of about one to about five percent.

11. The metal-air cell of claim 9, wherein said air mask comprises a gas mixing area.

12. The metal-air cell of claim 9, wherein said air mask comprises nickel-plated steel.

13. The metal-air cell of claim 9, wherein said air mask comprises plastic.

14. The metal-air cell of claim 13, wherein said air mask comprises a metal plate.

15. The metal-air cell of claim 13, wherein said air mask comprises a cathode tab.

16. The metal-air cell of claim 1, further comprising a film covering said reactive metal container.

17. The metal-air cell of claim 16, wherein said film comprises polyester.

18. A metal-air battery including a plurality of metal-air cells as claimed in claim 1, further comprising:

a gasket positioned between said reactive metal container and said air electrode; and an air mask positioned adjacent to said reactive metal container;

said plurality of metal-air cells positioned within a housing.

19. A metal-air battery as claimed in claim 18, wherein said air mask comprises a gas mixing area.

20. A metal-air battery as claimed in claim 18, further comprising an air manager positioned in fluid communication with said housing.

21. A metal-air battery, comprising:

a substantially rigid container comprising a reactive metal;

said substantially rigid container comprising a plurality of cell compartments sharing a common floor of said reactive metal and one or more common walls;

each said cell compartment comprising an electrolyte, an air electrode positioned therein, and an anode provided by said common floor of said reactive metal, thereby forming a plurality of metal-air cells; and a cover enclosing said substantially rigid container.

22. The metal-air battery of claim 21, wherein said reactive metal comprises zinc.

23. The metal-air battery of claim 21, further comprising an air manager positioned adjacent to said substantially rigid container.

24. The metal-air battery of claim 21, further comprising an air manager positioned within said substantially rigid container.

* * * * *